UNITED STATES PATENT OFFICE.

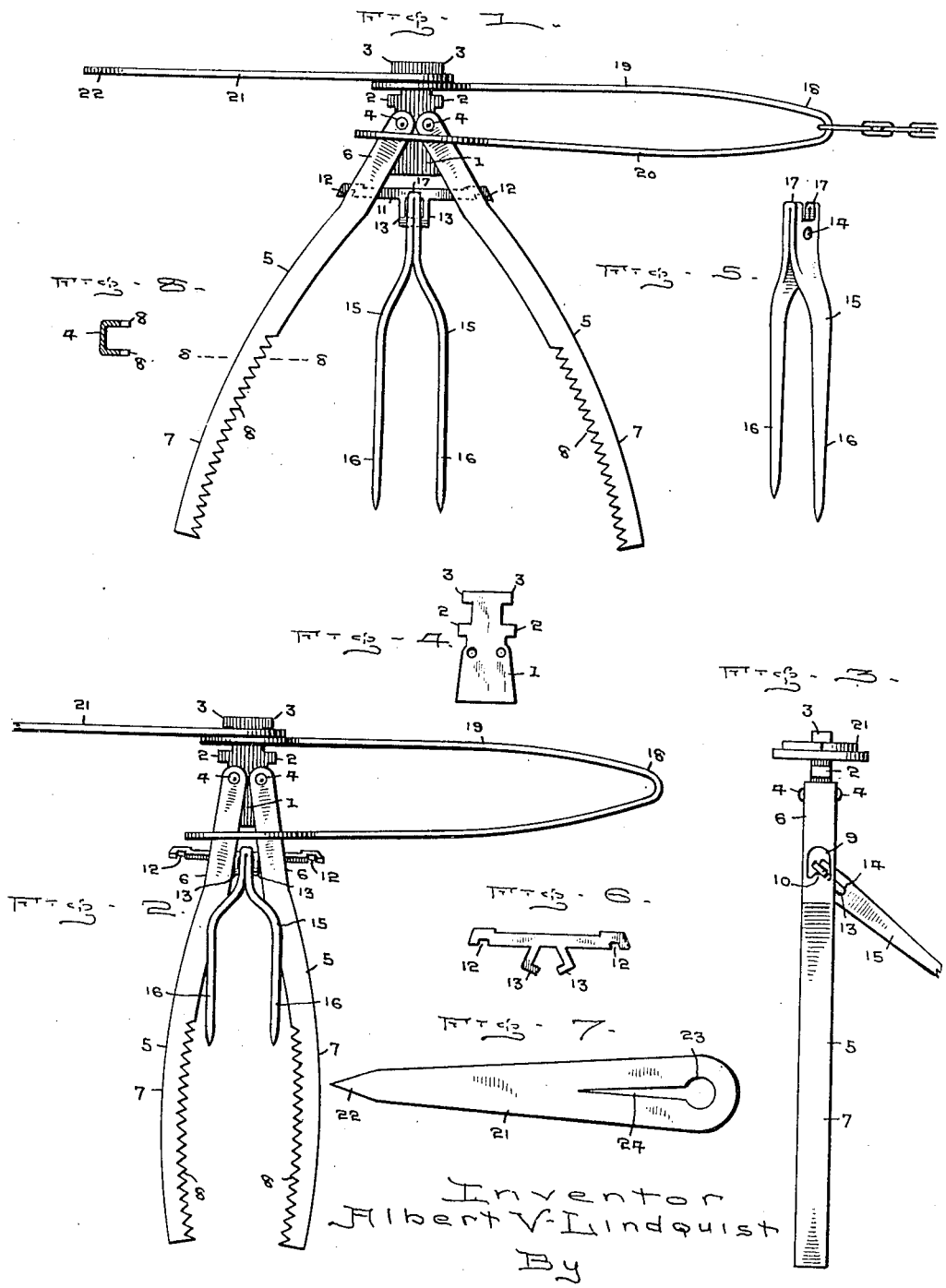

ALBERT V. LINDQUIST, OF ALEXANDRIA, MINNESOTA.

TRAP.

1,256,339.  Specification of Letters Patent.  Patented Feb. 12, 1918.

Application filed March 8, 1917.  Serial No. 153,322.

*To all whom it may concern:*

Be it known that I, ALBERT V. LINDQUIST, a citizen of the United States, residing at Alexandria, in the county of Douglas and State of Minnesota, have invented certain new and useful Improvements in Traps; and I do hereby declare the following to be a full, clear, and exact description of the invention, such as will enable others skilled in the art to which it appertains to make and use the same.

This invention relates to traps and more particularly to a steel trap designed for use in catching muskrats, gophers, and other burrowing animals.

The principal object of the invention is to provide a steel trap of the above stated character which embodies a pair of elongated jaws disposed at right angles to the U-shaped actuating spring so that the jaws of the trap can be inserted through an opening in the ground into the runway of the musk-rat or gopher.

Another object of the invention is to position the trap trigger intermediate the jaws so that when the latter are positioned within the musk-rat runway, the trigger will be disposed centrally in the runway so that the animal in passing through the runway must trip the trigger.

A still further object of the invention is to provide the trap with a handle disposed diametrically opposite the U-shaped actuating spring, said handle and spring coöperating to support the trap in the ground opening.

A still further object of the invention is to provide a device or trap of the above stated character which will be of cheap and inexpensive construction and which can be quickly and readily operated in an effective manner.

With these and other objects in view, as will appear as the description proceeds, the invention comprises the various novel features of construction, combination and arrangement of parts, as will be more fully described hereinafter and set forth with particularity in the appended claims.

Referring to the drawings:

Figure 1 is a side elevation of my improved steel trap, shown arranged in set position.

Fig. 2 is a side elevation of the trap, showing it sprung.

Fig. 3 is a side elevation of the trap as shown in Fig. 2.

Fig. 4 is a detailed elevation of the base member.

Fig. 5 is a detailed perspective view of the trigger.

Fig. 6 is a detail elevation of the trigger bar.

Fig. 7 is a detail plan view of the supporting handle bar which has been secured in position upon the base member; and Fig. 8 is a transverse sectional view taken on the line 8—8 of Fig. 1.

Similar characters of reference are used to denote like parts throughout the following description and the accompanying drawings.

Referring more particularly to the drawings reference numeral 1 indicates an elongated base member, which at one end is recessed in its opposite side edges to provide a pair of shoulders 2 and 3, respectively, and pivoted to the base member as at 4, adjacent the shoulders 2 are a pair of elongated jaw members 5.

Each of these jaws 4 is constructed of channel metal as clearly shown in Fig. 8 and embody an inner straight portion 6 and an outer curved portion 7, the inner opposed edges of the curved portion 7 being each formed with a series of notches or teeth 8. Extending transversely through the outer end of the straight portion 6 of each jaw member is an aperture 9 the bottom of which is formed intermediate its ends with a raised portion 10, as clearly shown in Fig. 3 of the drawings.

The trigger bar 11 is disposed through the apertures 9 and is provided adjacent its opposite ends with notches 12 which are designed to engage over the raised portions 10 of the aperture 9 to hold and maintain the jaws in open position. The trigger bar is further provided intermediate its ends with a pair of angular lugs 13 that are designed to be pressed together through the aperture 14 in the trigger 15 and form a pivotal support for the trigger.

As shown the trigger 15 is formed from a single strip of metal folded upon itself and having its free ends separate to provide a pair of arms 16. The upper end of the trigger is recessed to provide a pair of spaced lugs 17 and are designed to be positioned on opposite sides of the trigger bar 11. The space between the lugs 17 is slightly greater than the thickness of the trigger bar so that the trigger may have an independent movement of the trigger bar of say 10° before the trigger will be locked with trigger bar for movement therewith.

When the jaws have been arranged in set position, it will be apparent that by virtue of the raised portion 10, that when the trigger 15 has been moved upward to substantially a horizontal position, it will have locked the trigger bar 11 in the aperture 9 sufficiently to have disengaged the recess 12 from the raised portions 10 or the bottom of the aperture 9, thus allowing the jaws to spring together.

In order to close the jaws under tension I have provided a U-shaped expansion spring 18 which embodies the arms 19 and 20, the arm 20 being provided in its free end with an opening sufficiently large to receive the inner ends of the jaws and the base member, while the free end of the arm 19 is provided with an opening just sufficiently large to receive the shoulders 3 but not large enough to permit of the shoulders 2 passing through.

In order that the trap may be conveniently supported in the hole in the ground that connects with the musk-rat runway, I have provided a handle 21, which as shown in Fig. 7 has one end pointed or sharpened as indicated at 22, while the opposite end is provided with an aperture 25 which has communicating with it a V-shaped slit 24.

In assembling the device, the arms of the expansion springs 18 are arranged in position after which the handle 21 is arranged over the shoulders 3 and the handle subsequently is squeezed sufficiently to close the V-shaped slit 24, thus securing the handle around the connecting portion between the shoulders 2 and 3, respectively. From this it will be seen that the handle is freely rotatable around the base member and is adapted to be held in any rotated position through the expansive force of the U-shaped expansion spring.

While the handle 21 and the U-shaped expansion spring may be positioned upon the ground to support the trap within the musk-rat runway, it is to be understood that if desired and where the hole is of such a diameter as to permit, that the trap can be solely supported within the opening by simply inserting the end of the handle into the wall of the opening.

By the construction thus described it will be apparent that when the trap is suspended in the musk-rat runway, that the animal must strike against the trigger and trip the trap in an attempt to pass on through the runway, however the slight play of the trigger with respect to the trigger bar is such that it will tend to impress the animal that the trigger can be pushed entirely out of the way without any danger of his being caught.

What I claim as new is:—

1. A trap comprising a base member, a pair of elongated jaws pivotally attached to said base member and each provided with an aperture adjacent its inner end, an oscillatory trigger bar disposed through the aperture of said jaws and formed with notches adjacent each end adapted to engage the outer edges of said apertures to hold the jaws in open position, a trigger pivotally attached to and projecting from the trigger bar so as to permit of a slight relative movement of the trigger with respect to the trigger bar in either direction before tripping the trigger, and a U-shaped expansion spring having the ends of its arms apertured and mounted on said base member, one of said arms engaging the inner end portions of the jaws and serving to close the jaws upon the release of the trigger.

2. A trap comprising a base member, and a pair of jaws pivotally attached to said base member and each having their inner ends apertured, an oscillatory trigger bar disposed through the apertures of said jaws and provided adjacent each end with a notch, and a pair of lugs depending from the trigger bar intermediate its ends, a trigger having its inner end recessed to provide a pair of spaced lugs designed to be positioned on the opposite sides of the trigger bar, said trigger being provided with an aperture adjacent said recessed ends and adapted to receive said depending lugs to pivotally support the trigger from the trigger bar said trigger having a slight relative movement therewith and a U-shaped expansion spring for closing said jaws upon the actuation of the trigger bar.

3. In a trap of the class described, the combination with a base member, and a U-shaped expansion spring having its ends apertured and arranged over the base member, of a handle rotatably mounted on the inner end of the base member and adapted to be held in any rotatory position by the expansive force of said expansion springs and coöperating with said expansion spring to support the trap within the animal runway.

In testimony whereof I have signed my name to this specification in the presence of two subscribing witnesses.

ALBERT V. LINDQUIST.

Witnesses:
Geo. L. Treat,
Matilda E. Lindquist.

Copies of this patent may be obtained for five cents each, by addressing the "Commissioner of Patents, Washington, D. C."